US006556936B2

(12) United States Patent
Gooding et al.

(10) Patent No.: US 6,556,936 B2

(45) Date of Patent: Apr. 29, 2003

(54) METHOD AND APPARATUS FOR CORRELATING TRACE DATA FROM ASYNCHRONOUS EMULATION MACHINES

(75) Inventors: Thomas Michael Gooding, Rochester, MN (US); Roy Glenn Musselman, Rochester, MN (US); Robert Neill Newshutz, Rochester, MN (US); Jeffery Joseph Ruedinger, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 181 days.

(21) Appl. No.: 09/748,981

(22) Filed: Dec. 27, 2000

(65) Prior Publication Data

US 2002/0120413 A1 Aug. 29, 2002

(51) Int. Cl.[7] .................................................. G06F 19/00

(52) U.S. Cl. ........................ 702/115; 702/179; 702/182; 702/183; 714/25

(58) Field of Search ................................ 702/115, 182, 702/183, 179; 714/38, 34, 30, 31, 33, 47, 25; 375/354, 357, 359, 370

(56) References Cited

U.S. PATENT DOCUMENTS 4,590,550 A * 5/1986 Eilert et al. ................. 702/179
6,094,729 A * 7/2000 Mann .......................... 714/25
6,154,856 A * 11/2000 Madduri et al. ............ 712/227
6,189,140 B1 * 2/2001 Madduri ..................... 712/227

* cited by examiner

*Primary Examiner*—John Barlow
*Assistant Examiner*—Hien Vo
(74) *Attorney, Agent, or Firm*—Joan Pennington

(57) ABSTRACT

A method and apparatus are provided for correlating trace data from asynchronous machines, such as asynchronous emulation machines. A data capture signal is received from each of the plurality of asynchronous machines. The data capture signal from each of the plurality of asynchronous machines is sampled. Then the sampled data capture signal from each of the plurality of asynchronous machines and a cycle count are stored. A trace synchronization system is coupled to each of the plurality of asynchronous machines for receiving the data capture signal from each of the plurality of asynchronous machines. The trace synchronization system operates no slower than the data capture signal from each of the plurality of asynchronous machines, so that no data capture signals are missed.

16 Claims, 3 Drawing Sheets

TRACE SYNCHRONIZATION ARRAY 120

| CYCLE COUNT ENTRY NUMBER | DOMAINS 0 | 1 | 2 | 3 | * * * | M |
|---|---|---|---|---|---|---|
| FIRST | | | | | | |
| * * * | | | | | | |
| N-2 | 0 | 1 | 1 | 0 | | 0 |
| N-1 | 0 | 1 | 0 | 1 | | 0 |
| N | 0 | 0 | 1 | 1 | | 1 |

LAST ENTRY

FIG. 2

METHOD AND APPARATUS FOR CORRELATING TRACE DATA FROM ASYNCHRONOUS EMULATION MACHINES

FIELD OF THE INVENTION

The present invention relates generally to the data processing field, and more particularly, relates to a method and apparatus for correlating trace data from asynchronous machines, such as asynchronous emulation machines.

DESCRIPTION OF THE RELATED ART

It is often desirable to allow different emulation machines, or different partitions of the same machine, to operate asynchronously with one another. However, when operating in this mode, it is difficult to correlate the various traced events into a single event trace since each group of traces is captured with a different oscillator. A global correlation of traced events is needed to make problem resolution of asynchronous interfaces easier for the user.

To help debug emulated systems, a mechanism is needed to trace the activity of the emulated machine's logic. When asynchronously emulated machines or partitions are operating together, such as communicating through an asynchronous interface, it is difficult to correlate activities that occur at the same point in time in the different traces.

A need exists for a method and apparatus for correlating trace data from asynchronous emulation machines. It is desirable to correlate the various traced events from asynchronous emulation machines into a single event trace.

SUMMARY OF THE INVENTION

A principal object of the present invention is to provide a method and apparatus for correlating trace data from asynchronous machines, such as asynchronous emulation machines. Other important objects of the present invention are to provide such method and apparatus for correlating trace data from asynchronous machines substantially without negative effect and that overcome many of the disadvantages of prior art arrangements.

In brief, a method and apparatus are provided for correlating trace data from asynchronous machines, such as asynchronous emulation machines. A data capture signal is received from each of the plurality of asynchronous emulation machines. The data capture signal from each of the plurality of asynchronous machines is sampled. Then the sampled data capture signal from each of the plurality of asynchronous machines and a cycle count are stored.

In accordance with features of the invention, a trace synchronization system is coupled to each of the plurality of asynchronous machines for receiving the data capture signal from each of the plurality of asynchronous machines. The trace synchronization system operates no slower than any data capture signal from each of the plurality of asynchronous machines, so that no data capture signals are missed. The trace synchronization system includes a trace synchronization array for storing the sampled data capture signal from each of the plurality of asynchronous machines and a cycle count. The stored sampled data capture signal from each of the plurality of asynchronous machines with the stored cycle count in the trace synchronization array are processed for correlating the stored sampled data capture signal from each of the plurality of asynchronous machines. The plurality of asynchronous machines include a plurality of partitions of a single machine and the data capture signal from each of the plurality of partitions of the single machine are received, sampled and stored in the trace synchronization array.

BRIEF DESCRIPTION OF THE DRAWINGS

The present invention together with the above and other objects and advantages may best be understood from the following detailed description of the preferred embodiments of the invention illustrated in the drawings, wherein:

FIG. 2 is a block diagram representation illustrating a trace synchronization array of the trace synchronization system of FIG. 1 in accordance with the preferred embodiment.

DETAILED DESCRIPTION OF THE PREFERRED EMBODIMENTS

An obvious method for correlating trace data from asynchronous emulation machines is to distribute a common cycle counter to all clock partitions and record the count in each individual trace as it is captured. There are problems however in distributing the common cycle counter because each receiving partition is trying to asynchronously capture a group of bits, which may not be precisely generated together at the source and may not be simultaneously captured together by the receiver. This is a common problem in asynchronous interfaces, which for the emulation problem prevents this obvious solution from being practical.

Figure 1:
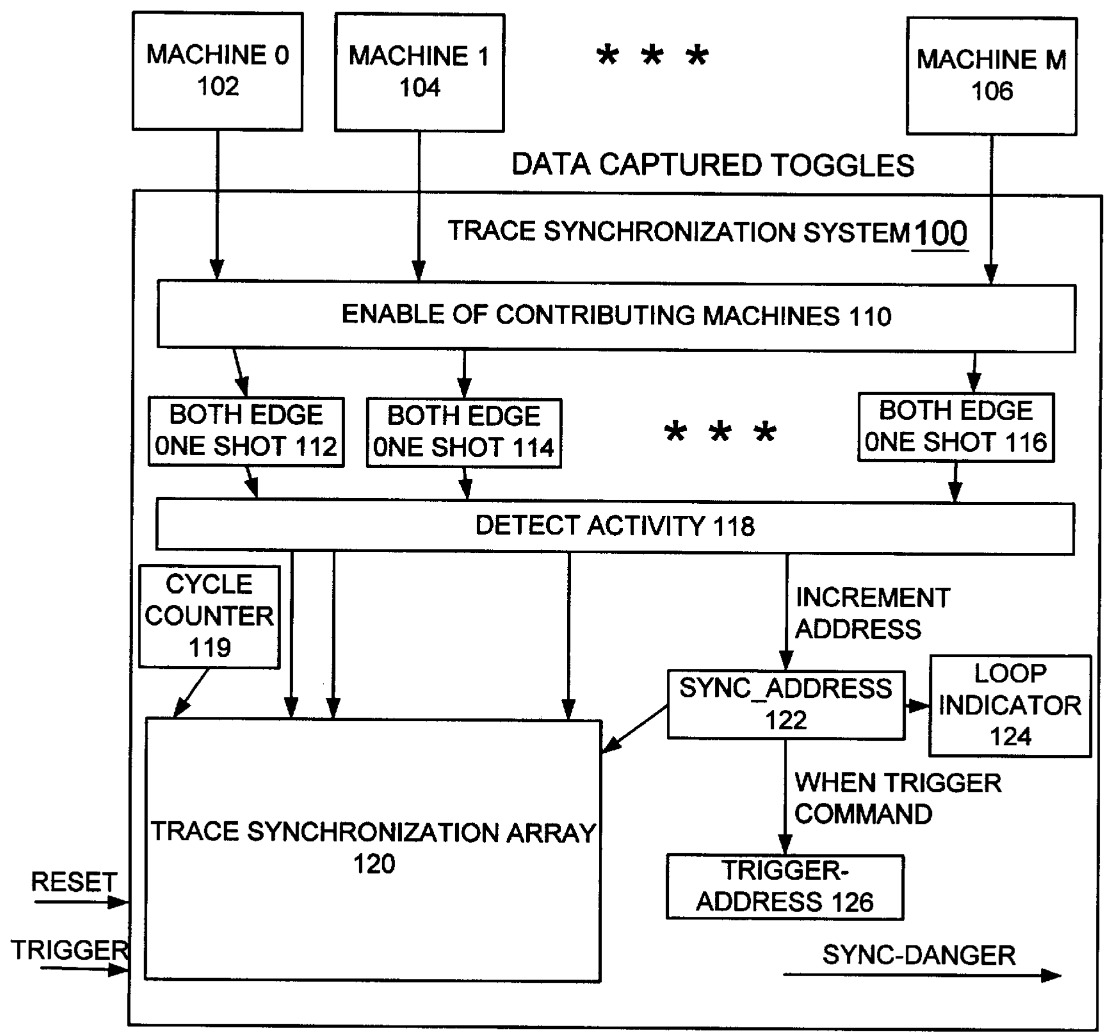
FIG. 1 is a block diagram representation illustrating a trace synchronization system for implementing methods for correlating trace data from asynchronous emulation machines in accordance with the preferred embodiment.

Having reference now to the drawings, in FIG. 1, there is shown a trace synchronization engine (TSE) or trace synchronization system of the preferred embodiment generally designated by the reference character 100. As shown in FIG. 1, a plurality of machines 0-M, 102, 104, 106 are coupled to the trace synchronization system 100. Each of the machines 0-M, 102, 104, 106 communicates to the trace synchronization system 100 with a single signal, a data captured toggle as indicated at lines labeled DATA CAPTURED TOGGLES. The line DATA CAPTURED TOGGLE toggles when capture trace data is stored in the trace on a particular machine 102, 104, or 106. Trace synchronization system 100 executes no slower than any data capture trace data of machines 0-M, 102, 104, 106 so that none of the toggles are missed. Trace synchronization system 100 also never stops unless tracing is stopped, further ensuring no toggles are missed. The data captured toggles are sampled at the beginning of a cycle of the trace synchronization system 100.

In accordance with features of the preferred embodiment, the trace synchronization system 100 implements methods for correlating trace data from asynchronous emulation machines by gathering at a common point one individual signal from each clock partition. The one individual signal is changed whenever the partition makes an entry in its local trace buffer. Within the common gathering point, the various signals are recorded in a corresponding array. Post processing allows the time relationship between each of the locally gathered trace buffers to be merged, while avoiding the asynchronous distribution and capturing problems of the above-described obvious method. Trace synchronization system 100 is suitably arranged to execute the flow chart of FIG. 3 of the preferred embodiment.

Trace synchronization system 100 includes an enable of contributing machines block 110 coupled to a plurality of both edge one shots 112, 114 and 116. A detect activity block 118 and a cycle counter 119 are coupled to a trace synchronization array 120. Detect activity block 118 provides an increment address input to a sync_address register 122. Sync_address 122 is coupled to a loop indicator latch 124 and provides a when trigger command input to a trigger_address register 126.

The data captured toggles that are enabled at block 110 are transformed into clocks by comparison with their last sampled value. When any toggles have switched state, then activity is detected at detect activity block 118 and an entry is made in the trace synchronization array 120 for the particular corresponding machine or machines 102, 104, or 106. In a trace synchronization array entry, trace data for each machine 0-M, 102, 104, and 106 is recorded as active or inactive as illustrated and described with respect to FIG. 2. Each entry is tagged with a cycle count, which records the time relative to the gathering of the TSE partition. When the sync_address register 122 loops through zero, then the loop indicator latch 124 is set to denote that all array locations contain entries.

A trigger input indicated at a line labeled TRIGGER signals the trace synchronization system 100 to record the current trace array address into the trigger_address register 126. This address is used to signify when the trigger occurred with respect to the traced data stored in the trace synchronization array 120.

A reset input indicated at a line labeled RESET resets the trace synchronization system 100 and readies the trace synchronization system to begin receiving data. All the internal counter and address registers 119, 122, 126 are set to zero. The loop indicator latch 124 is set to zero. Data recorded in the trace synchronization array 120 is not changed and is then overwritten with new data.

A sync_danger output is asserted to halt tracing, when the sync_address register 122 is near the trigger_address 126. This avoids overwriting the area of importance in the trace synchronization array 120.

Referring now to FIG. 2, there is illustrated the trace synchronization array 120 of the preferred embodiment in the system 100 of FIG. 1. Trace synchronization array 120 includes domains 0-M corresponding to the machines 0-M, 102, 104 and 106. Trace synchronization array 120 includes cycle counts from a first through N. A last entry in the trace synchronization array 120 is indicated at the cycle count N. Active or inactive status is stored for each domain 0-M at each of the cycle counts 1–N.

When the tracing has ended, the data including the contents of the trace synchronization array 120 is unloaded. The traces are correlated by examination of the contents of the trace synchronization array 120. The cycle counts of the cycle counter 119 recorded in the trace synchronization array 120 are used as a global timekeeper.

Synchronization of trace data is achieved by working backwards from the last entry in all traces at cycle count N, as shown in FIG. 2. For an entry in the trace synchronization array 120, some partitions have been marked as recording data. Trace data from the marked partitions are extracted and decorated with the corresponding cycle counter value from the trace synchronization array 120. A pointer to the trace entries in the marked partitions is then moved to the next earlier entry.

Exemplary pseudo code for the process of the preferred embodiment for merging domain values with synchronization array 120 follows:

```
for (D=0; D<M; ++D) {
    working_cycle (D) = last_cycle_for_domain D;
}
for (i=N; i≦first; --i) {
    for (D=0; D<M; ++D) {
        if (1==entry (i,D)) {
            add domain D trace data from working_cycle (D)
                to unified trace
            -- working_cycle (D)
        }
    }
}
```

Figure 3:
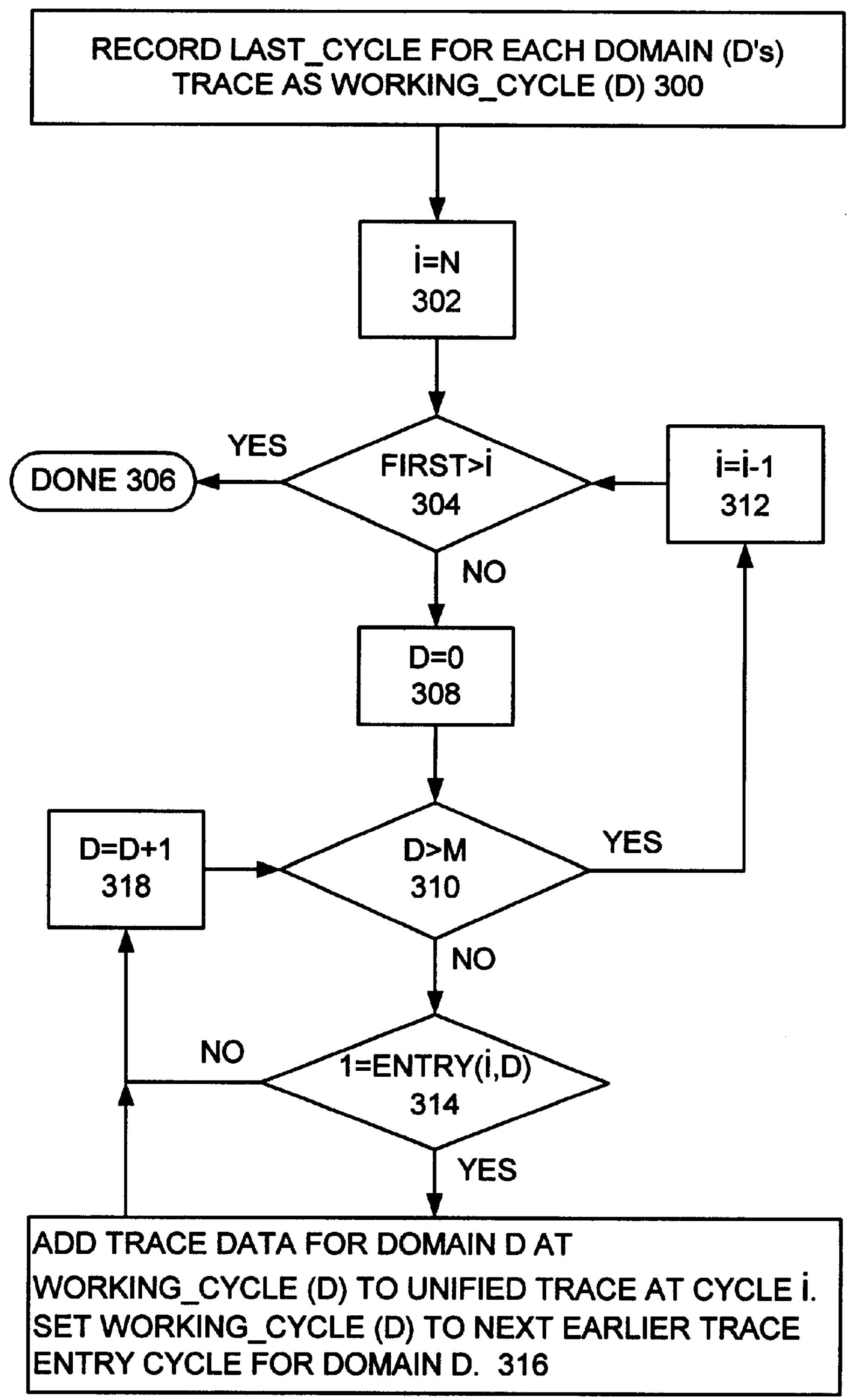
FIG. 3 is a logical flow diagram illustrating exemplary post processing steps for correlating trace data from asynchronous emulation machines in accordance with the preferred embodiment.

Referring to FIG. 3 there is shown a logical flow chart illustrating exemplary post processing steps for correlating trace data from asynchronous emulation machines in accordance with the preferred embodiment. As shown in the above pseudo code, first a last_cycle for each domain (D's) trace is recorded as working_cycle (D) as indicated in a block 300. Next i is set to cycle count N as indicated in a block 302. Checking for cycle count first greater than i is performed as indicated in a decision block 304. When cycle count first is greater than i, then the sequential operation are completed as indicated in a block 306. When cycle count first is less than or equal to i, then domain D is set to zero as indicated in a block 308. Checking whether domain D is greater than M is performed as indicated in a decision block 310. When domain D is greater than M, then i is decremented by one as indicated in a block 312. Then the sequential steps continue with decision block 304. When domain D is less than or equal to M, then checking whether 1 equals entry (i, D) is performed as indicated in a decision block 314. When 1 equals entry (i, D), then trace data for domain D at working_cycle (D) is added to unified trace at cycle i and working_cycle (D) is set to next earlier trace entry cycle for domain D as indicated in a block 316. Then and when determined that 1 does not equal entry (i, D), domain D is incremented by one as indicated in a block 318. Then the sequential steps continue with decision block 310.

While the present invention has been described with reference to the details of the embodiments of the invention shown in the drawing, these details are not intended to limit the scope of the invention as claimed in the appended claims.

What is claimed is:

1. A method for correlating trace data from a plurality of asynchronous machines comprising the steps of:

providing a trace synchronization system coupled to each of the plurality of asynchronous machines; said trace synchronization system performing the steps of:

receiving a data capture signal from each of the plurality of asynchronous machines;

sampling said data capture signal from each of the plurality of asynchronous machines at a cycle rate of said trace synchronization system; and storing said sampled data capture signal from each of the plurality of asynchronous machines with a cycle count.

2. A method for correlating trace data from a plurality of asynchronous machines as recited in claim 1 wherein said trace synchronization system executes at said cycle rate no slower than said data capture signal from each of the plurality of asynchronous machines.

3. A method for correlating trace data from a plurality of asynchronous machines as recited in claim 1 wherein the step of sampling said data capture signal from each of the plurality of asynchronous machines is performed at a beginning of each cycle of said trace synchronization system.

4. A method for correlating trace data from a plurality of asynchronous machines as recited in claim 1 wherein the step of storing said sampled data capture signal from each of the plurality of asynchronous machines and a cycle count includes the step of storing said sampled data capture signal from each of the plurality of asynchronous machines together with storing a cycle count in a trace synchronization array of said trace synchronization system.

5. A method for correlating trace data from a plurality of asynchronous machines as recited in claim 4 further includes the steps of processing said stored sampled data capture signal from each of the plurality of asynchronous machines with said stored cycle count in said trace synchronization array for correlating said stored sampled data capture signal from each of the plurality of asynchronous machines.

6. A method for correlating trace data from a plurality of asynchronous machines as recited in claim 1 wherein the plurality of asynchronous machines include a plurality of partitions of a single machine and wherein the step of receiving said data capture signal from each of the plurality of asynchronous machines includes the step of said data capture signal from each of the plurality of partitions of said single machine.

7. A method for correlating trace data from a plurality of asynchronous machines as recited in claim 1 includes the step of receiving a trigger input signal to said trace synchronization system, said trigger input signal signaling said trace synchronization system to record a current trace array address.

8. A method for correlating trace data from a plurality of asynchronous machines as recited in claim 7 includes the step of processing said recorded current trace array address and said stored sampled data capture signal from each of the plurality of asynchronous machines with said stored cycle count in said trace synchronization array for correlating said stored sampled data capture signal from each of the plurality of asynchronous machines and said trigger input signal.

9. A method for correlating trace data from a plurality of asynchronous machines as recited in claim 1 includes the step of receiving a reset input signal to said trace synchronization system, said reset input signal for readying said trace synchronization system to begin receiving said data capture signal from each of the plurality of asynchronous machines.

10. A method for correlating trace data from a plurality of asynchronous machines as recited in claim 4 includes the step of storing said sampled data capture signal from each of the plurality of asynchronous machines as active or inactive and storing a cycle count in said trace synchronization array of said trace synchronization system.

11. A method for correlating trace data from a plurality of asynchronous machines as recited in claim 10 includes the step of storing said sampled data capture signal from each of the plurality of asynchronous machines as active when said sampled data capture signal has switched state from a last sampled value.

12. A method for correlating trace data from a plurality of asynchronous machines as recited in claim 4 includes the step of asserting a predefined output signal by said trace synchronization system to halt storing said sampled data capture signal to avoid overwriting in said trace synchronization array.

13. Apparatus for correlating trace data from a plurality of asynchronous machines comprising:

enable logic for receiving a data capture signal from each of the plurality of asynchronous machines;

detect activity logic coupled to said enable logic for sampling said data capture signal from each of the plurality of asynchronous machines at a cycle rate no slower than said data capture signal from each of the plurality of asynchronous machines; and a trace synchronization array coupled to said detect activity logic for storing said sampled data capture signal from each of the plurality of asynchronous machines and a cycle count.

14. Apparatus for correlating trace data from a plurality of asynchronous machines as recited in claim 13 includes a cycle counter coupled to said trace synchronization array for storing said cycle count.

15. Apparatus for correlating trace data from a plurality of asynchronous machines as recited in claim 13 further includes a reset input, said reset input for readying said enable logic to begin receiving said data capture signal from each of the plurality of asynchronous machines.

16. Apparatus for correlating trace data from a plurality of asynchronous machines as recited in claim 13 further includes a trigger input, said trigger input for recording a current trace array address.

* * * * *